Feb. 1, 1955   J. B. GUNN   2,700,986
SERVO TYPE SOLENOID VALVE
Filed April 4, 1951
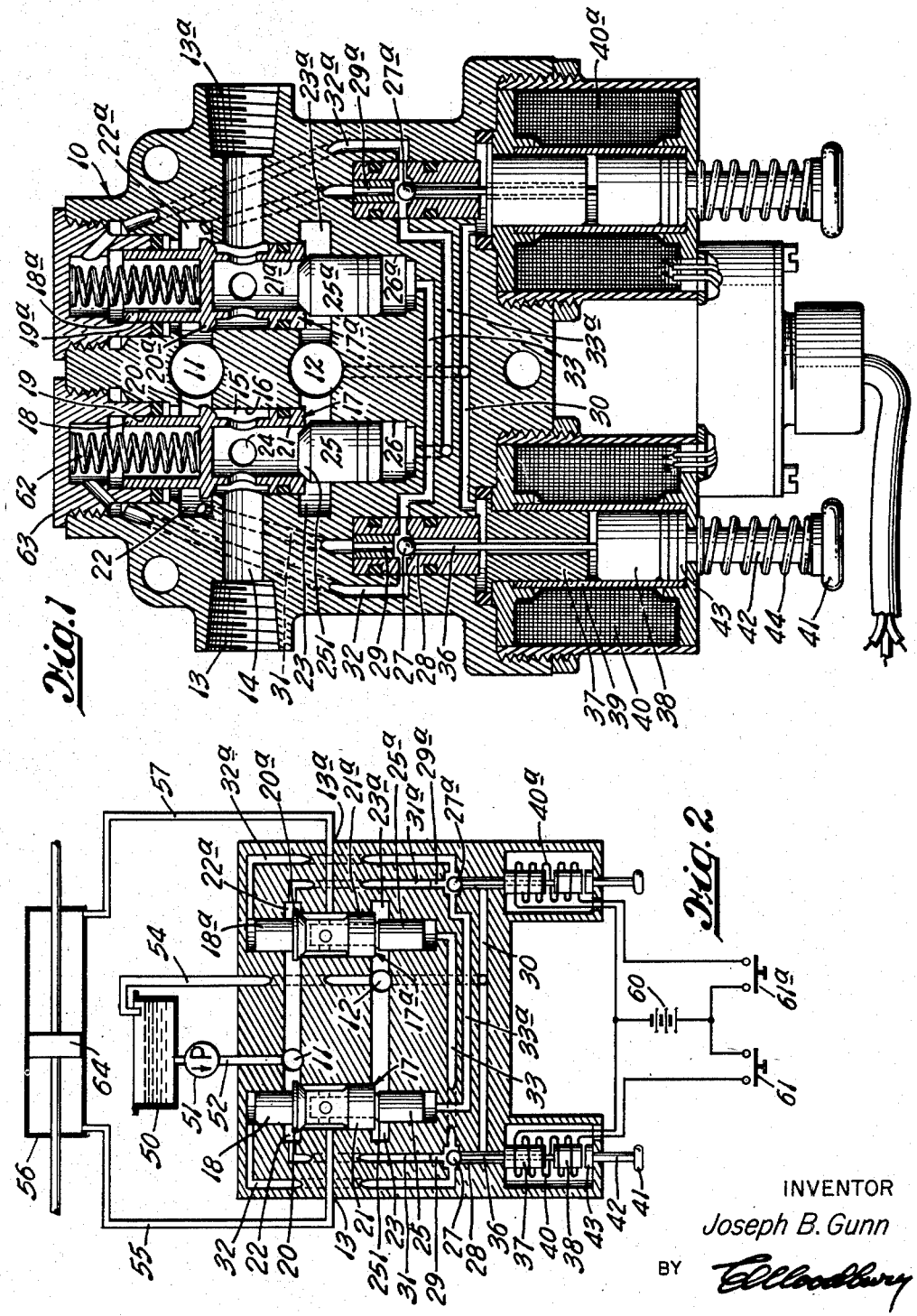
INVENTOR
Joseph B. Gunn
BY
ATTORNEY

2,700,986

Patented Feb. 1, 1955

United States Patent Office

2,700,986

SERVO TYPE SOLENOID VALVE

Joseph B. Gunn, North Hollywood, Calif., assignor to Bendix Aviation Corporation, South Bend, Ind., a corporation of Delaware Application April 4, 1951, Serial No. 219,283

2 Claims. (Cl. 137—623)

This invention relates to solenoid valves for controlling flow of fluid to and from a load such as a hydraulic motor, and it has to do more particularly with valves of the servo type in which the valve elements that control the main flow are actuated by fluid pressure under the control of small pilot valves that are easily actuated, either manually or electrically.

An object of the invention is to provide a valve of the type mentioned which is positive and reliable in operation, relatively simple and inexpensive and light and compact.

Other more specific objects and features of the invention will appear from the description to follow with reference to the drawing, in which:

Fig. 1 is a sectional view through a valve in accordance with the invention; and Fig. 2 is a schematic diagram illustrating the operation of the valve.

Referring first to Fig. 1, the valve therein depicted comprises a casing 10 having a pressure inlet port 11, an exhaust port 12, and a pair of working ports 13 and 13a respectively, which are to be connected to the inlet port 11 or the exhaust port 12. As will appear later, the valve has three positions of operation, namely, a neutral position in which the working ports 13 and 13a are both blocked, a first operating position in which the working port 13 is connected to the inlet port 11 and the working port 13a is connected to the exhaust port 12, and a second operating position in which the working port 13 is connected to the exhaust port 12 and the working port 13a is connected to the inlet port 11. The valve includes two identical valving mechanisms, one controlling the connections to the working port 13 and the other controlling the connections to the port 13a. It will be sufficient to describe in detail the valving mechanism associated with the port 13.

Thus the working port 13 is connected by a passage 14 with an annular chamber 15 defined by a cylinder 16 and a piston and poppet valve unit 17. The unit 17 has a first piston 18 sealing in a first cylinder 19, a poppet 20 adapted to seal against the upper edge of cylinder 16, and a second piston 21 sealing in the cylinder 16, which will hereinafter be referred to as the second cylinder. There is defined in the casing 10 between the cylinders 19 and 16, a pressure chamber 22 which is connected to the inlet port 11 so that application of pressure fluid to the working port 13 is controlled by the poppet 20.

The casing also defines an exhaust chamber 23 below the cylinder 16, which is connected to the exhaust port 12. Chamber 23 is adapted to be communicated through the hollow piston 21, lateral ports 24 therein, and the recess 15 with the working port 13. However such communication is adapted to be interrupted by a third piston 25 in a third cylinder 26 positioned below the chamber 23, the piston 25 having a poppet 251 on its upper end adapted to seat against and close the lower end of the hollow piston 21.

The position of the piston and poppet valve unit 17 and of the piston 25 are determined by the application of pressure fluid to portions of the unit 17 and to the underside of the piston 25 by a pair of pilot valves which are identical in construction. Thus, one of these pilot valves comprises a ball valve 27 moveable between a lower position in which it rests against and seals an exhaust passage 28 and an upper position in which it rests against and seals a pressure passage 29. The exhaust passage is connected through a passage 30 with the main exhaust port 12, and the pressure passage 29 is connected by a passage 31 with the pressure chamber 22 which is permanently connected to the pressure port 11. Also associated with the ball valve 27 is a passage 32 leading to the upper end of the first cylinder 19 containing the first piston 18, and a passage 33 leading to the lower end of the cylinder 26a, which is the counterpart of the third cylinder 26 previously described. When the ball 27 is in the lower position, shown, the pressure passage 29 is connected to the passage 32 which applies pressure to the upper end of the first cylinder 19 to move the piston 18 downwardly and seat the poppet 20 to block flow of pressure fluid from the chamber 22 to the working port 13. At the same time, pressure is applied from the passage 29 through the passage 33 to the lower end of the cylinder 26a to lift the poppet 25a against the lower end of its associated piston 21a. When the ball valve 27 is in its upper position, both the upper end of the cylinder 19 and the lower end of the cylinder 26a are connected to exhaust. The other ball valve 27a, when in lower position, applies pressure fluid from its associated pressure passage 29a through a passage 33a to the lower end of cylinder 26 and through a passage 32a to the upper end of the cylinder 19a. When the ball valve 27a is in its upper position, the lower end of the cylinder 26 and the upper end of cylinder 19a are connected to exhaust.

The ball valve 27 normally remains in its lower position because of the force of pressure fluid in the passage 29, but it is adapted to be lifted to close the pressure passage 29 by a rod 36 which may be either electrically or manually actuated. Thus the rod 36 is shown as extending through a stationary solenoid core 37 and connected to a moveable solenoid core 38 positioned therebelow and slidable in a guide tube 39. Cores 37 and 38 are surrounded by an energizing winding 40 and are slightly spaced apart as shown when the winding 40 is deenergized. When the winding is energized, the moveable core 38 is lifted toward the stationary core 37 to elevate the rod 36 and move the ball 27 against the end of the pressure passage 29 with sufficient force to block flow of fluid therepast.

The rod 36 can also be elevated manually by pressing on a button 41 on the lower end of a rod 42 that projects externally from the valve casing and is connected at its inner end to a piston 43 that seals with the tube 39. A helical compression spring 44 normally maintains the push button 41 in outermost position in which the piston 43 permits retraction of the moveable solenoid core 38 into the inactive position as shown. However, by pressing on the button 41 the operator can elevate the piston 43 and the moveable core 38 to move the ball 27 into its upper position.

The solenoid mechanism is connected by the passage around the rod 36 with the fluid passage 30 which is connected to exhaust and therefore has little pressure in it. However, the piston 43 sealing with the tube 39 prevents leakage of this fluid from the casing.

Referring now to Fig. 2, there is shown schematically a typical system in which the valve of Fig. 1 may be employed. Such a system comprises a fluid reservoir 50, and a pump 51 which draws fluid from the reservoir and delivers it through a duct 52 to the pressure port of the valve and thence to the pressure chambers 22 and 22a thereof. The exhaust chambers 23 and 23a of the valve are connected by the exhaust port 12 and a duct 54 with the reservoir 50. The working port 13 of the valve is connected by a duct 55 to one end of a motor cylinder 56, and the other working port 13a is connected by a duct 57 with the opposite end of the motor cylinder 56. The solenoids 40 and 40a are shown adapted to be selectedly energized from a battery 60 by a pair of push button switches 61 and 61a.

In the neutral position of the valve 10 as shown in Fig. 1, when both of the solenoids 40 and 40a are deenergized, pressure fluid is applied past the valve ball 27 to the upper end of the first piston 18 and to the lower end of the third piston 25a. At the same time pressure fluid is applied past the valve ball 27a to the upper end of the first piston 18a and to the lower end of the third piston 25. This maintains both of the third pistons 25 and 25a in engagement with the lower ends of the second pistons 21 and 21a respectively, but it does not lift the poppets 20 and 20a off their seats because the areas of the first pistons 18 and 18a to which the pressure fluid is applied are greater than the areas of the pistons 25 and 25a. Hence the working port 13 is blocked off from the pressure port 11 by the poppet 20, and from the exhaust port 12 by the poppet 25 on piston 25. The other working port 13a is similarly blocked.

In connection with the pressure balance or unbalance necessary to maintain the poppet 20 seated against the lifting force of piston 25, it is to be noted that the diameter of the piston 18 is greater than the diameter of piston 25; furthermore, the diameter of the upper end of the cylinder defining the seat of the poppet 20 is of larger diameter than the cylinder 19. Hence the effective pressure area tending to seat the poppet 20 is equal to the diameter of the poppet seat. To further insure closing of the poppet 20, a helical compression spring 62 is provided between the inner end of the hollow piston 18 and the cap 63 which defines the cylinder 19.

It will appear from the foregoing description that when neither of the solenoid valves is energized, both the working ports 13 and 13a are blocked, thereby retaining the motor 56 (Fig. 2) in static condition.

Now assume that the valve ball 27 is moved into its upper position, either by actuation of the solenoid 40 or of the pushbutton 41. This disconnects the upper end of cylinder 19 and the lower end of the cylinder 26a from the pressure passage 29 and connects them to the exhaust passage. The release of pressure from the upper end of cylinder 19 reduces the force tending to hold the poppet 20 seated below the force exerted by the piston 25, and the piston 25 and the piston and poppet valve unit 17 move upwardly, thereby admitting pressure fluid from the port 11 to the working port 13 and thence through the duct 55 to the left end of the motor cylinder 56.

The release of pressure fluid from the lower end of cylinder 26a permits the piston 25a to drop away from its seat in the piston 21a thereby connecting the port 13a to the exhaust chamber 23a and the exhaust port 12, so that the piston 64 of the motor cylinder 56 can move to the right, exhausting fluid through the duct 57, the port 13a, through the hollow piston 21a and the exhaust chamber 23a to the exhaust port 12. It is to be noted that the pressure in the left end of the motor cylinder 56 will develop sufficient pressure in the right end of the cylinder to force the piston 25a away from the piston 21a despite any frictional resistance to movement of the piston 25a.

When the motor cylinder 56 is to be energized to move the piston 64 in the opposite direction, the valve ball 27 is left in released position, and the ball 27a is elevated to close off its associated pressure passage 29a. This removes pressure fluid from the upper end of the piston 18a, permitting the piston and poppet valve unit 17a to rise in response to force applied thereto by the piston 25a, thereby opening the poppet 20a to apply pressure fluid to the working port 13a. At the same time, pressure is removed from the underside of the piston 25, permitting the latter to open in response to flow of exhaust fluid into the working port 13.

Although for the purpose of explaining the invention, a particular embodiment hereof has been shown and described, obvious modifications will occur to a person skilled in the art, and I do not desire to be limited to the exact details shown and described.

I claim:

1. A 4-way selector valve comprising: a casing having a high pressure port, an exhaust port, and a pair of working ports; two pressure operated valve units one associated with one working port and the other with the other working port, each valve unit including a moveable valve mechanism having first and second pressure faces and moveable in response to high pressure on its first face and exhaust pressure on its second face to connect its associated working port to said exhaust port, and moveable in response to high pressure on its second face and exhaust pressure on its first face to connect its associated working port to said pressure port; pilot valve means comprising first and second pilot valves each having high pressure and exhaust ducts connecting to said high pressure and exhaust ports respectively, a control passage and means normally connecting said control passage to said high pressure duct but operable to transfer its said control passage from connection with said high pressure duct to connection with said exhaust duct; and means connecting the control passage of said first pilot valve to said first pressure face of one of said units and to said second pressure face of the other said unit, and connecting the control passage of said second pilot valve to said first pressure face of the said other unit and to the second pressure face of said one unit.

2. A valve according to claim 1 in which said first and second pilot valves each comprise: a body defining a chamber and a pair of aligned oppositely disposed fluid passages extending from said chamber and constituting said high pressure and exhaust ducts respectively and defining valve seats at their juncture with said chamber said body also defining a passage constituting said control passage communicating with said chamber at a point therein intermediate said pair of aligned passages, a valve ball in said chamber shiftable to close one or the other of said high pressure or exhaust ducts, and means including a rod extending through said exhaust duct for shifting said valve ball from engagement with the exhaust seat into engagement with the high pressure seat.

References Cited in the file of this patent

UNITED STATES PATENTS

| | | |
|---|---|---|
| 783,671 | Bloom | Feb. 28, 1905 |
| 2,225,082 | Orshansky | Dec. 17, 1940 |
| 2,331,817 | Turchan | Oct. 12, 1943 |
| 2,387,007 | Buchanan | Oct. 16, 1945 |
| 2,393,076 | Van Der Werff | Jan. 15, 1946 |
| 2,437,723 | Brant | Mar. 16, 1948 |
| 2,459,456 | Rockwell | Jan. 18, 1949 |
| 2,464,998 | Stevens | Mar. 22, 1949 |
| 2,563,419 | Rockwell | Aug. 7, 1951 |